United States Patent
Blewett et al.

(10) Patent No.: US 8,862,582 B2
(45) Date of Patent: Oct. 14, 2014

(54) SYSTEM AND METHOD OF ORGANIZING IMAGES

(75) Inventors: Charles Blewett, Madison, NJ (US);
Enrico Bocchieri, Chatham, NJ (US);
Giuseppe Di Fabbrizio, Florham Park, NJ (US); Donnie Henderson, Manalapan, NJ (US); Thomas Killian, Westfield, NJ (US); Thomas Kirk, Califon, NJ (US); David Kormann, Morristown, NJ (US); Gregory T. Vesonder, Boonton Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 918 days.

(21) Appl. No.: 11/940,703

(22) Filed: Nov. 15, 2007

(65) Prior Publication Data

US 2009/0132467 A1   May 21, 2009

(51) Int. Cl.
*G06F 17/30* (2006.01)
*G06K 9/00* (2006.01)

(52) U.S. Cl.
CPC .... *G06F 17/30864* (2013.01); *G06F 17/30244* (2013.01); *G06F 17/30265* (2013.01)
USPC .......................................... 707/736; 382/154

(58) Field of Classification Search
None
See application file for complete search history.

(56) References Cited

U.S. PATENT DOCUMENTS

| | | | | |
|---|---|---|---|---|
| 3,566,080 A * | 2/1971 | Uffelman et al. | ............. | 382/190 |
| 4,923,066 A * | 5/1990 | Ophir et al. | ................... | 209/538 |
| 5,502,576 A * | 3/1996 | Ramsay et al. | ............... | 358/444 |
| 5,517,234 A * | 5/1996 | Gerber et al. | ................. | 348/126 |
| 5,768,421 A * | 6/1998 | Gaffin et al. | .................. | 382/209 |
| 5,796,611 A * | 8/1998 | Ochiai et al. | ....................... | 702/3 |
| 5,860,066 A * | 1/1999 | Rouse | ........................... | 705/301 |
| 5,912,980 A * | 6/1999 | Hunke | .......................... | 382/103 |
| 5,978,804 A * | 11/1999 | Dietzman | ............................ | 1/1 |
| 5,999,639 A * | 12/1999 | Rogers et al. | ....................... | 382/132 |
| 6,069,696 A * | 5/2000 | McQueen et al. | ............. | 356/326 |
| 6,192,360 B1 * | 2/2001 | Dumais et al. | ........................ | 1/1 |
| 6,205,236 B1 * | 3/2001 | Rogers et al. | ................. | 382/132 |
| 6,240,424 B1 * | 5/2001 | Hirata | .......................... | 707/749 |
| 6,269,358 B1 * | 7/2001 | Hirata | ........................... | 1/1 |
| 6,327,581 B1 * | 12/2001 | Platt | ............................... | 706/12 |
| 6,360,139 B1 * | 3/2002 | Jacobs | ......................... | 700/232 |
| 6,445,834 B1 * | 9/2002 | Rising, III | ..................... | 382/305 |
| 6,449,384 B2 * | 9/2002 | Laumeyer et al. | ............ | 382/104 |
| 6,526,158 B1 * | 2/2003 | Goldberg | ...................... | 382/115 |

(Continued)

OTHER PUBLICATIONS

Kiyoki, Y., Kitagawa, T., and Hayama, T. 1994. A metadatabase system for semantic image search by a mathematical model of meaning. SIGMOD Rec. 23, 4 (Dec. 1994), 34-41. DOI= http://doi.acm.org/10.1145/190627.190639.*

(Continued)

*Primary Examiner* — Tarek Chbouki

(57) ABSTRACT

Disclosed are a system, method and computer-readable medium for organizing images. A method aspect relates to receiving an image into a device, receiving incidental information associated with the image, organizing the image and the incidental information into a data structure such as a sparse array, classifying the received image with an image classifier and storing the classified image in an image database, receiving a search query and responding to the search query by searching for and retrieving matching images in the image database based on a comparison of the image search query to the data structure.

19 Claims, 6 Drawing Sheets

(56) References Cited

U.S. PATENT DOCUMENTS

| | | | |
|---|---|---|---|
| 6,625,317 B1* | 9/2003 | Gaffin et al. | 382/209 |
| 6,889,163 B2* | 5/2005 | Hashitani et al. | 702/182 |
| 6,978,226 B2* | 12/2005 | Kanehira et al. | 702/183 |
| 7,065,232 B2* | 6/2006 | Geng | 382/115 |
| 7,068,309 B2* | 6/2006 | Toyama et al. | 348/231.5 |
| 7,069,259 B2* | 6/2006 | Horvitz et al. | 706/25 |
| 7,110,880 B2* | 9/2006 | Breed et al. | 701/482 |
| 7,231,061 B2* | 6/2007 | Bradley | 382/100 |
| 7,333,963 B2* | 2/2008 | Widrow et al. | 706/18 |
| 7,379,627 B2* | 5/2008 | Li et al. | 382/305 |
| 7,383,282 B2* | 6/2008 | Whitehead et al. | 707/700 |
| 7,418,444 B2* | 8/2008 | Flank et al. | 1/1 |
| 7,479,969 B2* | 1/2009 | Behiels | 345/629 |
| 7,525,484 B2* | 4/2009 | Dupray et al. | 342/450 |
| 7,560,720 B2* | 7/2009 | Voigt et al. | 250/559.46 |
| 7,650,319 B2* | 1/2010 | Hoffberg et al. | 706/45 |
| 7,663,671 B2* | 2/2010 | Gallagher et al. | 348/231.2 |
| 7,668,346 B2* | 2/2010 | Xiao et al. | 382/118 |
| 7,688,996 B2* | 3/2010 | Bradley | 382/100 |
| 7,693,817 B2* | 4/2010 | Dumais et al. | 707/999.002 |
| 7,734,087 B2* | 6/2010 | Hwang et al. | 382/159 |
| 7,876,934 B2* | 1/2011 | Georgescu et al. | 382/128 |
| 7,912,278 B2* | 3/2011 | Fung et al. | 382/159 |
| 7,958,063 B2* | 6/2011 | Long et al. | 706/12 |
| 2001/0026631 A1* | 10/2001 | Slocum et al. | 382/115 |
| 2002/0049606 A1* | 4/2002 | Dan et al. | 705/1 |
| 2002/0059221 A1* | 5/2002 | Whitehead et al. | 707/5 |
| 2002/0072878 A1* | 6/2002 | Kanehira et al. | 702/183 |
| 2002/0157095 A1* | 10/2002 | Masumitsu et al. | 725/46 |
| 2002/0174120 A1* | 11/2002 | Zhang et al. | 707/7 |
| 2003/0086627 A1* | 5/2003 | Berriss et al. | 382/305 |
| 2003/0222977 A1* | 12/2003 | Yoshino | 348/51 |
| 2004/0002932 A1* | 1/2004 | Horvitz et al. | 706/46 |
| 2004/0025180 A1* | 2/2004 | Begeja et al. | 725/46 |
| 2004/0039529 A1* | 2/2004 | Hashitani et al. | 702/1 |
| 2004/0044952 A1* | 3/2004 | Jiang et al. | 715/500 |
| 2004/0090439 A1* | 5/2004 | Dillner | 345/440 |
| 2004/0098362 A1* | 5/2004 | Gargi | 707/1 |
| 2004/0107181 A1* | 6/2004 | Rodden | 707/1 |
| 2004/0175041 A1* | 9/2004 | Miller | 382/190 |
| 2004/0212695 A1* | 10/2004 | Stavely et al. | 348/231.3 |
| 2004/0218788 A1* | 11/2004 | Geng | 382/118 |
| 2004/0218827 A1* | 11/2004 | Cohen et al. | 382/243 |
| 2005/0084154 A1* | 4/2005 | Li et al. | 382/190 |
| 2005/0123202 A1* | 6/2005 | Hwang et al. | 382/224 |
| 2005/0131660 A1* | 6/2005 | Yadegar et al. | 703/2 |
| 2006/0004711 A1* | 1/2006 | Naam | 707/3 |
| 2006/0047419 A1* | 3/2006 | Diendorf et al. | 701/208 |
| 2006/0195440 A1* | 8/2006 | Burges et al. | 707/5 |
| 2006/0253258 A1* | 11/2006 | Miyake | 702/19 |
| 2006/0265661 A1* | 11/2006 | Ball | 715/734 |
| 2006/0274145 A1* | 12/2006 | Reiner | 348/62 |
| 2007/0016553 A1* | 1/2007 | Dumais et al. | 707/2 |
| 2007/0061023 A1* | 3/2007 | Hoffberg et al. | 700/83 |
| 2007/0083507 A1* | 4/2007 | Bowman et al. | 707/5 |
| 2007/0115373 A1* | 5/2007 | Gallagher et al. | 348/231.3 |
| 2007/0120844 A1* | 5/2007 | Beikirch et al. | 345/419 |
| 2007/0122031 A1* | 5/2007 | Berriss et al. | 382/165 |
| 2007/0203942 A1* | 8/2007 | Hua et al. | 707/104.1 |
| 2007/0239610 A1* | 10/2007 | Lemelson | 705/51 |
| 2007/0286455 A1* | 12/2007 | Bradley | 382/100 |
| 2007/0288432 A1* | 12/2007 | Weltman et al. | 707/3 |
| 2007/0288462 A1* | 12/2007 | Fischer et al. | 707/7 |
| 2008/0077570 A1* | 3/2008 | Tang et al. | 707/5 |
| 2008/0082426 A1* | 4/2008 | Gokturk et al. | 705/27 |
| 2008/0144068 A1* | 6/2008 | Digby | 358/1.13 |
| 2008/0159627 A1* | 7/2008 | Sengamedu | 382/190 |
| 2008/0208922 A1* | 8/2008 | Wolas-Shiva et al. | 707/202 |
| 2008/0281915 A1* | 11/2008 | Elad et al. | 709/204 |
| 2009/0006285 A1* | 1/2009 | Meek et al. | 706/12 |
| 2009/0024579 A1* | 1/2009 | Obrador | 707/3 |
| 2010/0329529 A1* | 12/2010 | Feldman et al. | 382/131 |

OTHER PUBLICATIONS

Davis, M., King, S., Good, N., and Serves, R. 2004. From context to content: leveraging context to infer media metadata. In Proceedings of the 12th Annual ACM international Conference on Multimedia (New York, NY, USA, Oct. 10-16, 2004). Multimedia '04. ACM, New York, NY, 188-195. DOI= http://doi.acm.org/10.1145/1027527.1027572.*

* cited by examiner

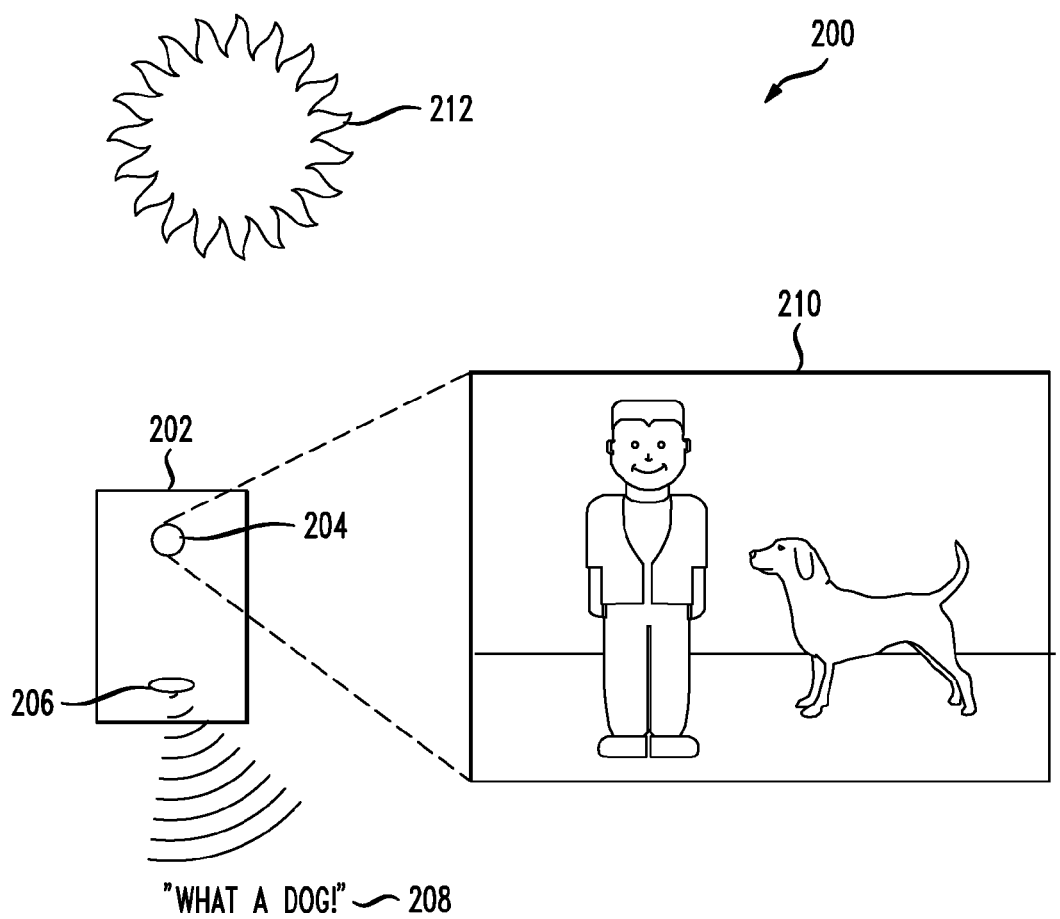

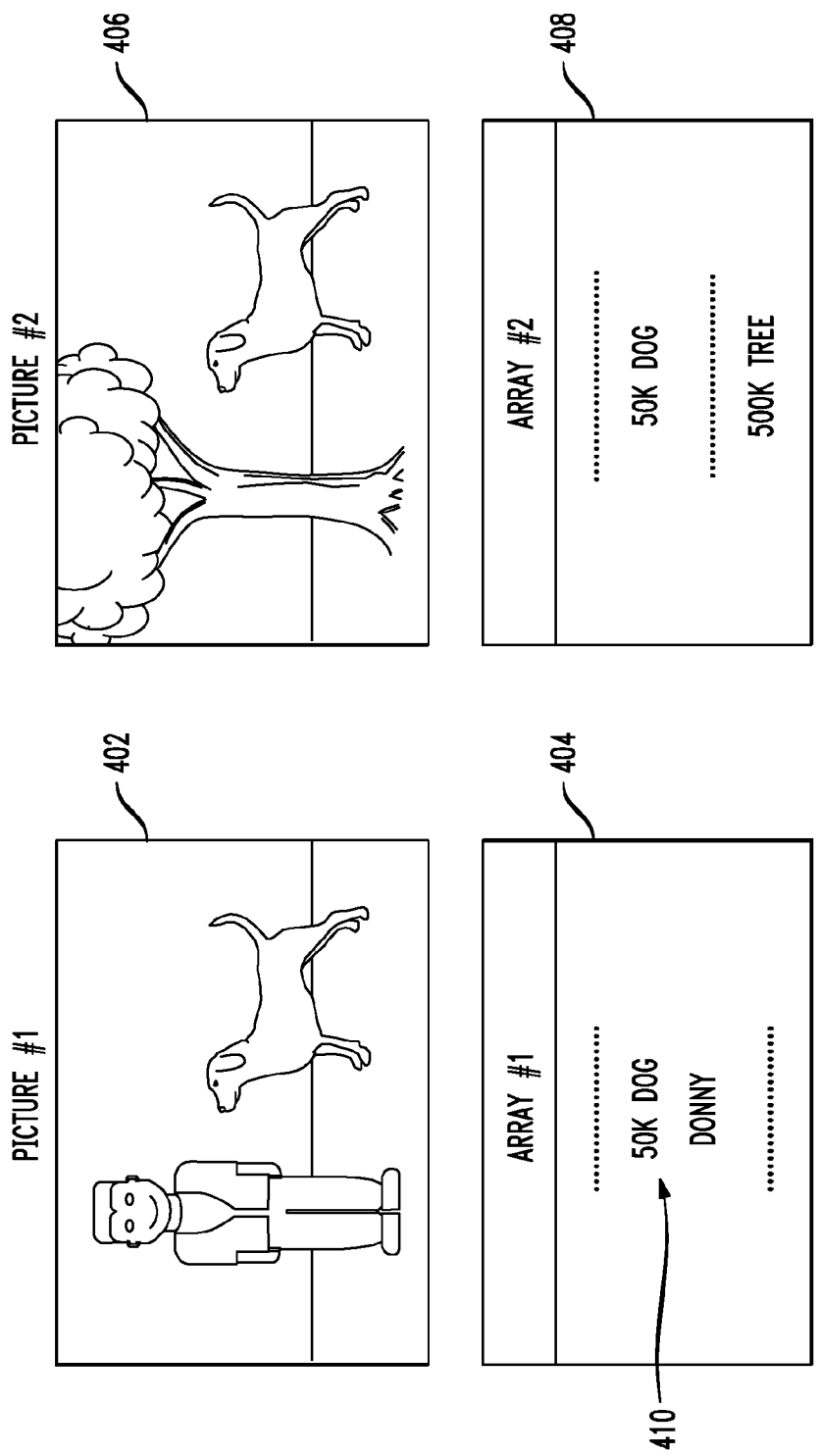

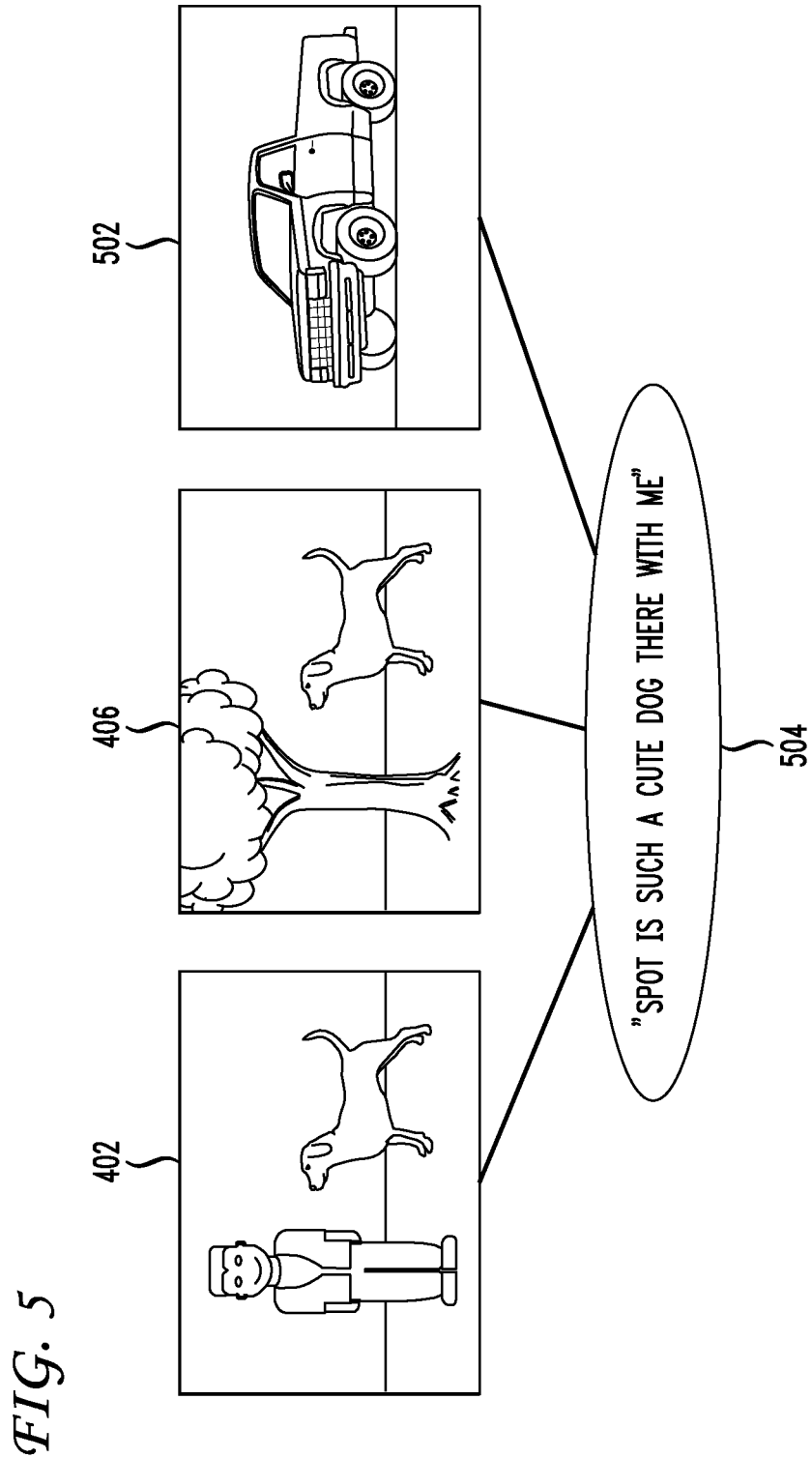

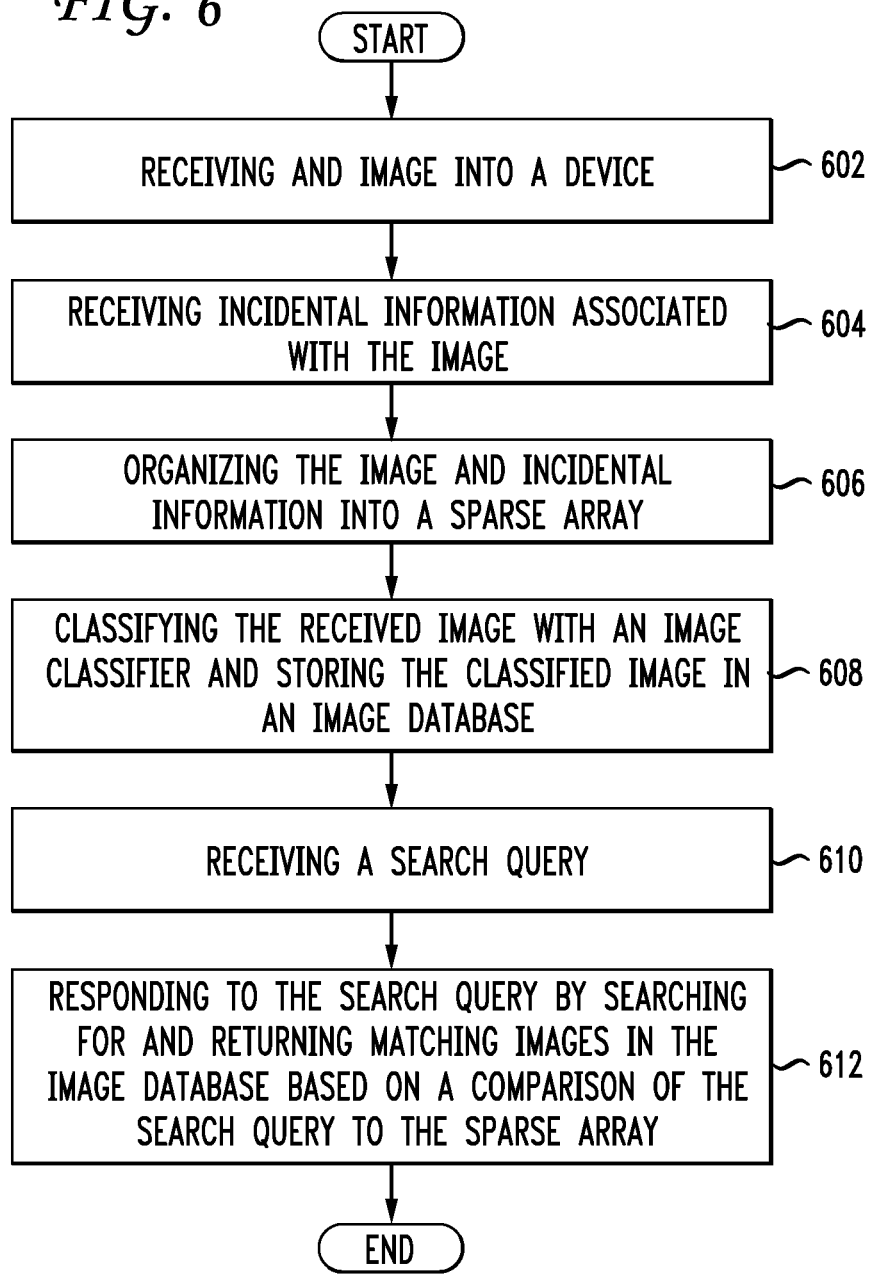

SYSTEM AND METHOD OF ORGANIZING IMAGES

BACKGROUND OF THE INVENTION

1. Field of the Invention

The present invention relates to organizing images and more specifically to gathering incidental information associated with an image and using that incidental information in a later search and retrieval process.

2. Introduction

With the ubiquitous nature of digital cameras in the world today, there is an issue that arises wherein people are constantly taking and storing digital images. For example, many people have devices such as cell phones or portable devices which have the capability to take still and short video image sequences. These images are often ultimately uploaded to a computer and stored in various file folders. With the opportunity to take many pictures, people have difficulty in organizing and maintaining their various stores of pictures. Often, people desire to retrieve a particular picture and cannot remember either which device the picture may be stored on or which folder may be stored in. Accordingly, what is needed in the art is an improved method and system of organizing a large number of pictures.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer-readable media for organizing images. A method embodiment of the invention includes receiving an image into a device, receiving incidental information associated with the image, organizing the image and incidental information into a sparse array or other data structure, classifying the received image with an image classifier and storing the classified image in an image database, receiving a search query and responding to the search query by searching for and returning matching images in the image database based on the comparison on the search query to the sparse array or other data structure. All automatically associated data including classification data, can be stored in the same spare array or data structure.

Another aspect of this embodiment relates to the sparse array being infinite in length and being open to receiving further incidental information. In this context, after the initial receipt of an image, for example, by taking a picture using a cell phone, the method relates to gathering secondary incidental information upon a further viewing of the image. In this context, if a viewer takes a picture at noon and makes comments about the picture, that incidental information regarding the time, the temperature, the audio signal can be stored in a sparse array or other data structure and associated with that image. Then later, as a user pulls up the image on the cell phone and provides further comments, additional secondary incidental information can be stored in the sparse array or other data structure to further aid in later retrieval of the image.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2 illustrates the basic approach of gathering incidental information when a picture is taken;

FIG. 4 illustrates several data structures for several pictures;

FIG. 5 illustrates an aspect of gathering further incidental information; and FIG. 6 illustrates a method embodiment of the invention.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1A:
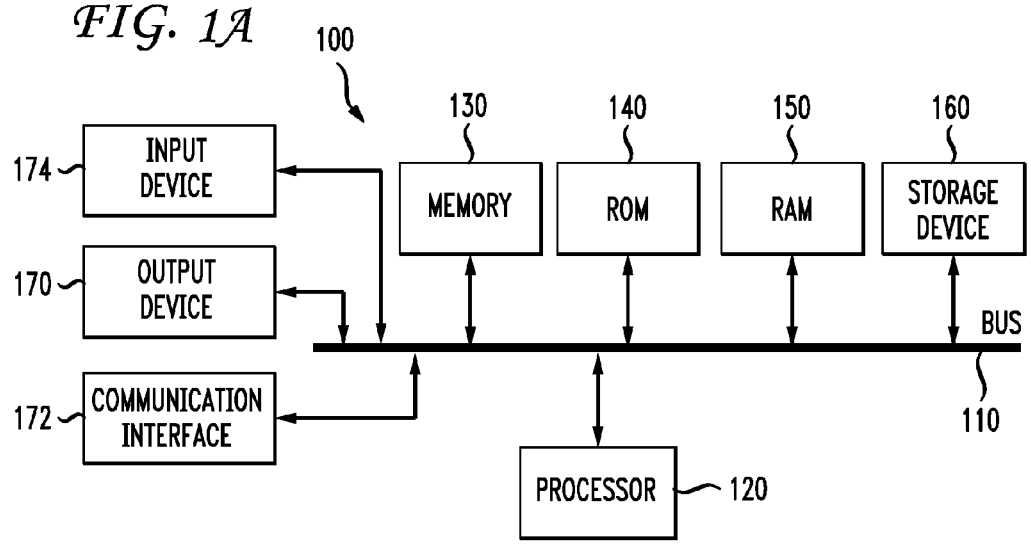
FIG. 1A illustrates an example system embodiment.

With reference to FIG. 1A, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 174 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 172 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 1B:
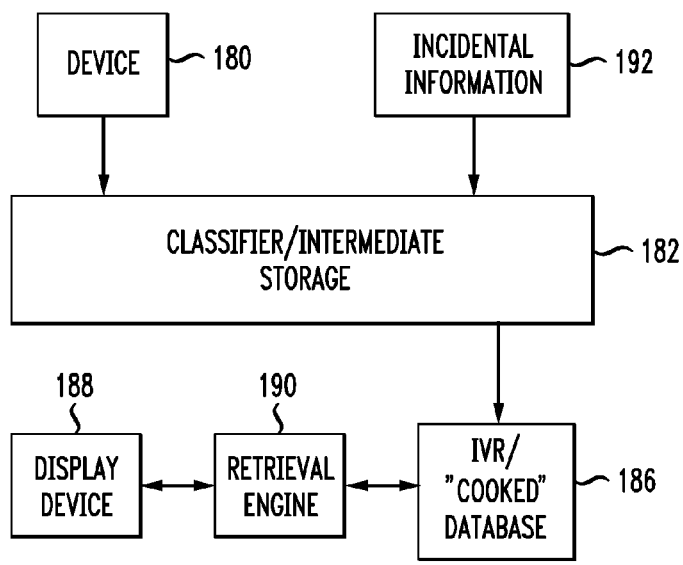
FIG. 1B illustrates basic components associated with an aspect of the invention.

As has been noted above, an aspect of the present disclosure relates to a process and system for organizing images. FIG. 1B illustrates some basic components which may be associated with a system. A device 180 refers to any device which can receive an image and/or video. The device may be a cell phone, camera, camcorder, and so forth. One of skill in the art would recognize the various types of devices which may be used to retrieve image and/or video data. Block 182 refers to a classifier and intermediate storage module 182 which can provide several features and functionalities associated with the images. This module 182 can be integral with the device 180 or may separately receive images from the device over a network such as a wireless or wired network. Portions of the functionality of module 182 may also be performed on the device 180 or in a network. For example, speech can be partially or fully processed in device 180. Features associated with this module include image processing and gathering incidental information. For example, the module 182 can utilize automatic speech recognition for word spotting. In this regard, the device 180 can include various mechanisms (not shown) but which are known in the art to gather incidental information. For example, a microphone, a thermometer for gathering temperature, a module for determining a location of the device 180 such as using network time difference of arrival (NTDOA), proximity data, GPS data and so forth. Module 182 can include image processing algorithms such as pattern recognition and templates. In this regard, using pattern image processing, the classifier 182 can identify particular objects within an image such as dogs, people, vehicles, scenery and so forth. Using known image processing techniques, the module 182 may classify the various images and provide that classification data in a sparse array. The system gathers data in name/value pairs, for example, "dog" and "Spot" or "tree" and "big".

In one aspect, NTDOA or TDOA data can be gathered from other equipment that is not tightly coupled to the primary receiving device. For example, if a group of people are all taking pictures at the same location with cell phone cameras, or are in the vicinity of someone with a cell phone camera that is talking a picture, then incidental data from those devices can contribute to the data in the data structure. Thus, a system will coordinate and weigh potential incidental data based on various parameters, such as time, distance from primary device, orientation, similarity of composition (some people in pictures), and so forth. For example, two cameras may be next to each other but facing opposite directions. Thus, the visual information from each camera may weigh less in the data structure than the audio or temperature data does to the particular orientation of each camera. Either through weighting or via a threshold analysis will information from other devices be relevant. A device may be a neighboring device and thus have its data included based on an analysis.

Feature 192 generally represents incidental information which may be provided to the system. This may include such information as data regarding current events and weather. For example, a picture may be taken of a large warehouse fire and there may be incident information that is generally chronologically relevant in which information on the internet discussed a warehouse fire and the location of the device 180 can be correlated to using the incidental information such that this various data may be stored in a sparse array associated with a particular image. Feature 186 represents an information retrieval and "cooked" database. That is, the sparse arrays are organized in a form that is preferable for searching. This database may represent the images and its associated sparse array. This database is preferably organized for utilizing the sparse array for retrieval of particular images. As images populate the database 186, a user may be able to use a display device 188 (which may or may not be the same device 180) to submit search queries which can be processed by retrieval engines and a categorization display front end 190 which can communicate with the database 186 to be able to enable the searching, matching and returning of an appropriate image or images in response to a user query. The matching process may conceptually involve determining if a name in one sparse array (a search array) matches with a name in a stored array for an image. If the names match, then values within the arrays may then be compared in their aligned state to determine a final match.

Accordingly, an aspect of the disclosure enables the automatic organization of an image based on gathered incidental information such as date, time, position, orientation of a device, word spotting in received audio, analysis of music or other non-word audio, analysis of prosody in a user's voice, and so forth. For example, if a user takes a picture and the associated audio included with that picture includes people screaming or loud noises in the background or high tension in a user's voice, that incidental information may be utilized to add further information into the sparse array beyond just mere words and word spotting spoken by the user. All the incidental information is stored in the database associated with the image and can be used for search and retrieval. Incidental information may include key words such as names or other nouns that are spoken and recognized around the time the photo was taken, information about who was nearby at the time the photo was taken and so forth. E911 techniques may be used to gather some of this incidental information as well as pattern recognition. As has been noted above, other incidental information may refer to weather, stock market information, or any other data.

The classifier 182 may utilize particular templates in its classification process. Such "named" templates by be supplied by the system or by the end user to categorize the images. For example, to create a personal template for a family, the family may submit a series of family pictures which may be used to train a template to identify particular family members rather than just identifying generically that people are in images. Of course, any set of images may be used to identify animals, cars, planes, etc. Standard templates for various types of objects may be used. In this regard, more accurate automatic classification of images taken by cameras or phones owned by members of that family may be utilized to provide improved and more accurate information regarding who is exactly in each image. In one aspect, a comparison weighting can weigh a bit higher for personal templates than standard templates. The user of a personal template may even be able to "tag" the template with audio, text or other incidental data that may improve the population of sparse arrays. For example, providing audio supports of each person in a photo with identification of who said what.

In one implementation, images that are taken on a cell phone are automatically transferred to a storage facility 182 where further complex processing can occur. The incidental and associated data can be stored in a number of ways which enable easy search and retrieval. A user then logs into an image archival service via module 182 or 190, for example, and launches a search of photos. The user could also upload a photo and ask for a search of similar matches across and image archive like Flickr or photo catalog. If matches are found, they are presented in an interface tailored for the presentation results. One preferable implementation is to store the data in a sparse array or data structure similar to that used by those of skill in the art for information retrieval. Sparse arrays are particularly good for many search tasks including specifying routing algorithms wherein incoming items can be quickly categorized or routed based on a sample sparse matrix specified for each category or routing application. An example of a sparse array would be using an integer which has the count for every time a particular incident happened that you are interested in. For example, you can have a series of 20 photographs and a picture of your dog Spot in ten of those photographs. In a sparse array associated with each image, there can be an entry that indicates the number of times a particular object such as Spot are found in a series of images. Similarly, a sparse array can store an integer that relates to a frequency of the occurance of words that were spoken either before, during and/or after the particular time an image was taken. In this manner, a sparse array or data structure can be considered an infinite length array or structure which has stored in it numbers that are associated with some kind of event associated with the image. When somebody desires to search the images, they can create another sparse array and then a retrieval engine or processing algorithm may compare sparse arrays with sparse arrays using a various metrics which would be known to those of skill in the art to identify matching images.

FIG. 2 illustrates a basic aspect of the invention in which a user has a device 202 with a camera feature 204 and a microphone feature 206. The camera 204 is used to take a picture 210 of the boy Donny and his dog Spot. While he is taking the picture Donny (or somebody) says "What a dog!" 208. In this overall scene 200 we note that the sun 212 is out at the time. Thus, in this particular instance, incidental information can include that fact that it is sunny with the particular amount of light that is available at the time, the audio "What a dog!" and other completely separately gathered information which may be correlated to the image based on other factors such as the time of day and so forth. Incidental data may come from neighboring devices that provide other pictures, audio, or weather-related data, or any other data.

Figure 3:
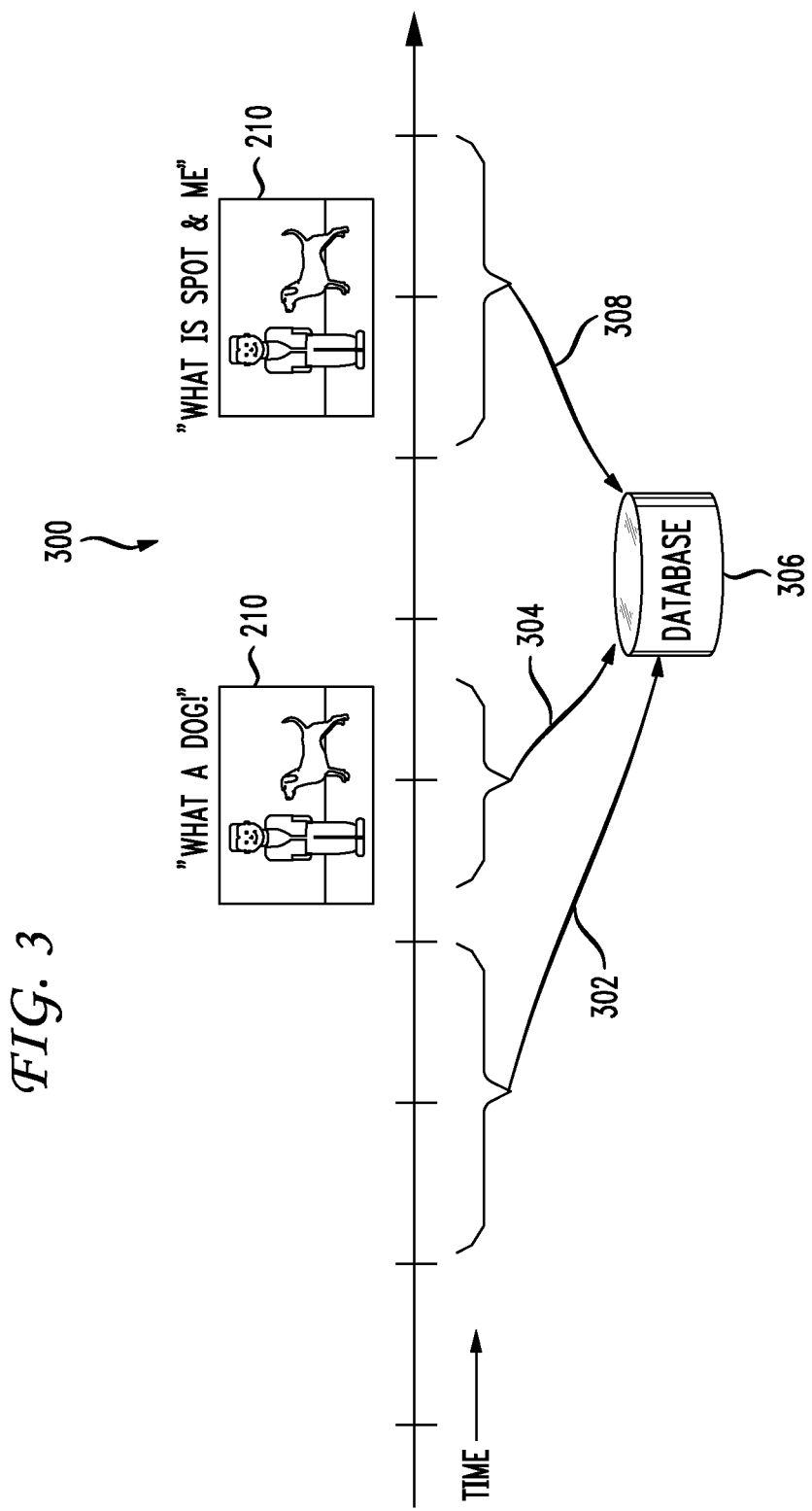
FIG. 3 illustrates the gathering of first incidental and second incidental information.

FIG. 3 illustrates another aspect of the invention wherein the incidental information does not necessarily have to be chronologically associated with the taking of the image. For example, the X axis in this image represents time and feature 302 represents time prior to the taking of image 210 in which someone stated "What a dog!" 304. Time 304 may represent for example time within seconds or minutes prior to and following the taking of image 210. However, there may be conversation or other incidental information represented in 302 that occurs prior to taking of the image 210 which may also be useful and valuable. Accordingly, this data may be stored in a database 306 and processing algorithms may be used to determine what information if any from time period 302 may be utilized and stored in a sparse array associated with the image 210. FIG. 3 also illustrates a later time 308 which can represent a user retrieving an image from their device 202 at a later time. This later time may be days, hours or months later. However, inasmuch as the same image is brought up, the sparse array associated with that image which is open ended, can retrieve further information associated with that image. Thus, the user can later say "That is Spot and me" while viewing that picture. Speaker recognition techniques can be used to identify that the "me" is Donny. Thus, further information can be added to the sparse array which identifies the person as Donny (or may strengthen the weight of an earlier determination from a template which identified the person in the image as Donny with, say, 60% accuracy). In this regard, information of the sparse array can be added onto at a later time.

FIG. 4 illustrates a general concept of the sparse arrays associated with several pictures. Picture No. 1 illustrates Donny and his dog Spot 402. Also illustrated in FIG. 4 is array No. 1 404 which includes various pieces of information. Feature 410 highlights a particular memory location, such as location 23, which stores identification of the person as Donny and "50K" is associated with the dated dog. 50K ca represent the size of that particular object, in this case a dog, in the image or some other weighting parameter. It also can represent another kind of weighting of that data in the sparse array. Some implementations can use keywords but for most IR systems, each word has a specific location. Picture No. 2 shows a dog and a tree 406. Array No. 2 associated with this image includes the 50K data associated with the dog as well as 500K associated with the tree 408. Again, this can represent a weighting or some kind of parameter associated with the individual data points in the array.

In addition to sparse arrays, the data structure may also be arranged using XML. An example entry is the following:

```
<attribute>
    <name> dog </name>
    <weight> 23 </weight>
<attribute>
<attribute>
    <name> donny </name>
    <weight> 4 </weight>
<attribute>
```

Typically, sparse arrays assume that they are modeling a large area of memory with the location being significant. For example, array location 23 (410) might be used in all cases to store the weight or weighting associated with the word "dog."

As sparse arrays, for IR, assume this congruence between a specific word and a location in the array, this makes computation much faster. In the XML case, one must find the word via some kind of look up—often hashing, but in some cases linear comparison. Again, the lookup can be avoided in the IR style sparse arrays described herein.

The way sparse arrays are represented in memory can be similar to lists of pairs of index and value or weight. For example, pairs of numbers such as 44, 23 and 54, 2. The first integer is the array location and the second is the weight.

There are variants on this technique that look like CDR coding in some lisp language implementations. Tags (strings) and array indices can be mixed in together. The software that provides the implementation of the arrays checks each index value to see if it is an integer or a string. Thus, the data structure used herein can be a sparse array XML or a relational database scheme to store the incidental data.

FIG. 5 illustrates the concept of gathering further incidental information associated with the images that were previously stored. In this context, users often pull up either on a computer or some other display several images at once. In this case, image 402 with Donny and his dog is being viewed, image 406 with a tree and the dog is shown and image 502 is being viewed showing a truck. In this case, the system knows that these three images are currently being viewed by the user and secondary incidental information is gathered in which a user or a person states that "Spot is such a cute dog there with me." Again, speaker identification may be utilized to identify the speaker as Donny, then the sparse array for images 402 and 406 may be updated with further data that has particular weights. For example, image 402 may have additional data added to the sparse array with a higher weight relative to the data added to the sparse array for image 406. This would be because the indication and the analysis of the speech 504 that was provided would indicate that the most likely image that is being discussed is image 402 because of the reference "me" and the dog. However, because the dog is in image 406 there may be some data that is added to the sparse array for image 406 although at a lesser weight. Similarly, there may be some data added to the sparse array for image 502 but inasmuch as the comment 504 does not mention a truck, that data, if at all, may have a lower weight.

FIG. 6 illustrates a method embodiment of the invention. The method may be practiced on a single computing device or system or may be distributed over several devices such as those shown in FIG. 1B. The method relates to organizing images and includes one or more of the steps of receiving and image into a device (602), receiving incidental information associated with the image (604), organizing the image and incidental information into a sparse array (606), classifying the received image with an image classifier and storing the classified image in an image database (608). Receiving a search query (610) and responding to the search query by searching for and returning matching images in the image database based on a comparison of the search query to the sparse array (612).

As has been shown herein, the step of receiving incidental information can occur before, after and/or during the taking of the picture. Other aspects of the method can include the incidental information relating to at least one of environmental data, chronologically relevant audio input to the device, NTDOA data, location data, device orientation data, news data and so forth. The environmental data can relate to at least one of time, date, location information, color, object detection, temperature, received audio when the image was received by the device, audio received prior to or after the image was received and so forth.

As has been noted above, another aspect of the disclosure relates to retrieving secondary incidental information and adding that information to the sparse array. In this regard, the method relates to after storing an image in the image database and upon retrieval of the image from the image database, receiving second incidental information associated with the image and storing the second incidental information in the sparse array. This step preferably occurs during later viewing of the stored image by a user. Thus, as the user retrieves the image, the system received secondary incidental information that is associated with an image and the system may assign a modified weight to at least a portion of the secondary incidental information wherein the secondary incidental information is stored in the sparse array. The weighting of such secondary incidental information may be based on at least one parameter that can relate data associated with the incidental information to the data associated with the secondary incidental information. In other words, if the user retrieves the image six months after the image was taken, then a parameter that relates the initial incidental information (such as the time the image was taken as a picture) and the secondary information (wherein the parameter would be six months later) may be used to modify to a certain degree the weights given to the secondary incidental information. The weights may increase or decrease.

However, if the secondary incidental information, although received six months later, is information rich audio which includes a discussion of the image, the time difference may be outweighed by a characterization of the time of incidental information and thus the data that goes into the infinitely open sparse array may have a higher weight then data associated with the image at the time the image was taken. For example, it may be determined that when the user took the image six months prior, that the audio spoken by the user had nothing to do with the image. The user at that time may have been having a discussion about a car or current events while taking a picture of their dog and a tree, but the image may have nothing to do with the particular conversation. Accordingly, as can be appreciated, the weight is given to various pieces of information in the sparse array are easily manipulated and modified based on analysis of the various parameters and incidental information.

Furthermore, another aspect of modifying the weights of various features in the sparse arrays may be the user preference in searches. For example, if a user continues to perform a certain kind of search, for example, the user may continually search for pictures associated with their dog. In that case, various weights in the sparse array may be modified based on user activity in terms of their searching preferences. Furthermore, an aspect of the disclosure and the ability of using such sparse arrays may be to enable a user when later viewing an image, to provide a natural language search query which is very general and is essentially multimodal in nature. In other words, if the system knows that they are presenting picture 402 to the user and it is the only picture being presented and it includes Donny and his dog Spot. The user may be able to upload an image or retrieve an image and say or input "Show me other picture like this one". This inquiry may generate a short sparse array which can utilize basic key information about the picture that is being presented. In this regard, while the stored sparse array associated with image 402 may have a lot of information, the sparse array generated as part of this basic search query "Show me other pictures like this one" may generate a sparse array that includes such features as the dog Spot and Donny and the sun shining. Then the information retrieval process may utilize a routing algorithm where the search sparse array may be matched with the more detailed sparse arrays that are associated with the various images and actually return a series of images that are "like this one", i.e., like the one that is currently being presented to the user. Also as has been noted above, the definition of "the image" may encompass both a still image as well as a video. In the case of video, there may be multiple images within the video that are classified and processed in a manner similar to that discussed above relative to processing a single image. The sparse array may simply utilize more information. For example, if a user pans from an image of a dog and Donny, over to an image of their truck, then the sparse array associated with that video snip-it may encompass both information about a dog, a boy and a vehicle. Furthermore, an aspect of the invention may be that individual images that are combined to make up the video image may be separately searched. In this regard, automatic processing of such a video image may be the equivalent of having an individual sparse array for the individual images that make up the video segment. If a user were being presented with an image of Donny and his dog and were to ask for "Show me pictures like this one" the system may engage in a brief dialog with the user to request whether they are searching for still images only or images within video segments. The system may also just automatically present all images that are found. Thus, if images that are part of an video segment are to be returned, the user may actually receive a series of images that present the individual portions of the video segment in which Donny and his dog are found. Thus, this aspect of the invention enables a much more rich searching even of video content then was previously available.

The concept described above also enables a possibility of a richer sparse array for any individual image in a video scene. For example, in the scene in which the video camera pans from Donny and his dog over to a truck, the individual sparse arrays associated with each individual image in that pan may also be cross-referenced such that there may be data associated with a truck in the sparse array of the individual images that only include Donny and his dog, although with a lesser weight or a modified weight, but that information may be helpful and valuable in terms of the later searching possibilities. Accordingly, the above concepts enable the gathering through various sources of incidental information data associated with the context that a picture or video is taken in. The context is essentially the world and the principles disclosed herein enable a way to manage various pieces of incidental information into a sparse array and via information retrieval mechanisms search for and retrieve at a later time appropriate images.

In another aspect of the invention related to a user uploading, retrieving or providing an image or series of images and requesting "Get me other images that are kind of like these" is the mechanism of performing this kind of search. Here, the system combines all the sparse arrays associated with the image or images into another sparse array that would be similar to a routing algorithm notion. Then, the system processes user's images based on that combined sparse array for the instances. So, for example, the user may input search terms or requests for pictures of "Donny" and his "dog". The system may return 15 images and the user may select, for example, 4 of these images as relevant. The sparse arrays associated with those images are processed. For example, a simple mechanism would be to add the sparse array and average them. Other processes may occur as well. Then, the system in the background after processing the sparse arrays and perhaps performing other processing, the system uses the new sparse array and searches and presents the next group of pictures as a result of processing based on the new sparse array. Thus, in the processing using the new sparse array additional pictures may be returned which were previously missed in the original search. This system may also bring up more loosely affiliated pictures which may include other features such as siblings or other objects. Combining or processing the sparse arrays associated with the 4 images enables a stronger set of semantics that may modify or adjust values or weights within various positions in the sparse array so that the ultimate search is improved using a new sparse array.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. For example, any concept disclosed herein for sparse arrays, such as their infinite nature to receive further data, may be applied to different data structures used to store data associated with an image. Other configurations of the described embodiments of the invention are part of the scope of this invention. Accordingly, the appended claims and their legal equivalents should only define the invention, rather than any specific examples given.

We claim:

1. A method comprising:
receiving scene description information associated with an image, the scene description information comprising semantic data for a plurality of objects within the image;
assigning a weight to each object in the plurality of objects based on the semantic data, the weight being independent of a geographic location, to yield weighted scene description information;
organizing, via a processor, the image and the weighted scene description information into a data structure, wherein the data structure comprises, for each object in the plurality of objects, a storage array as an infinite array of the each object;
classifying the image based on the data structure to, yield a classified image;
modifying the weight of a specific object in the plurality of objects based on user search preferences and repeated searching for the specific object, to yield a modified object weight;
storing the modified object weight for the specific object in the infinite array for the specific object; and upon receiving a search query, responding to the search query by returning matching images in the image database based on a comparison of the search query to the data structure using the modified object weight.

2. The method of claim 1, wherein the scene description information comprises one of environmental data, chronologically relevant audio input to a device, network time difference of arrival data, and device orientation data.

3. The method of claim 2, wherein environmental data comprises one of time, color, object detection, temperature, received audio when the image was received by the device, and audio.

4. The method of claim 1, further comprising:
after storing the classified image in the image database, upon retrieval of the image from the image database, receiving second scene description information associated with the image and storing the second scene description information into the data structure.

5. The method of claim 1, further comprising during a later viewing by a user of the image stored in the image database, receiving second scene description information associated with the image and automatically assigning a modified weight to a portion of the second scene description information, when the second scene description information is stored in the data structure.

6. The method of claim 5, wherein the modified weight assigned to the second scene description information is based on a parameter that relates data associated with the scene description information to the second scene description information.

7. The method of claim 1, wherein the image classifier is trained using personal data of a user who is associated with a device that receives the image.

8. The method of claim 1, wherein the image is a video.

9. A system comprising:
a processor; and
a computer-readable storage medium having instructions stored which, when executed by the processor, cause the processor to perform operations comprising:
receiving scene description information associated with an image, the scene description information comprising semantic data for a plurality of objects within the images;
assigning a weight to each object in the plurality of objects based on the semantic data, the weight being independent of a geographic location, to yield weighted scene description information;
organizing the image and the weighted scene description information into a data structure, wherein the data structure comprises, for each object in the plurality of objects, a storage array as an infinite array of the each object;
classifying the image based on the data structure to, yield a classified image;
modifying the weight of a specific object in the plurality of objects based on user search preferences and repeated searching for the specific object, to yield a modified object weight;
storing the modified object weight for the specific object in the infinite array for the specific object; and
upon receiving a search query, responding to the search query by returning matching images in the image database based on a comparison of the search query to the data structure using the modified object weight.

10. The system of claim 9, wherein the scene description information comprises one of environmental data, chronologically relevant audio input to a network time difference of arrival data, and device orientation data.

11. The system of claim 10, wherein the environmental data comprises one of time, color, object detection, temperature, received audio when the image was received by a device, and audio.

12. The system of claim 9, the computer-readable storage medium having additional instructions stored which result in the operations further comprising:
after storing the classified image in the database and upon retrieval of the image from the image database, receiving second scene description information associated with the image and storing the second scene description information into the data structure.

13. The system of claim 9, the computer-readable storage medium having additional instructions stored which result in the operations further comprising:
during a later viewing by a user of the image stored in the image database, receiving second scene description information associated with the image and automatically assigning a reduced weight to a portion of the second scene description information wherein the second scene description information is stored in the data structure.

14. A computer-readable storage device having instructions stored therein, which, when executed by a computing device, cause the computing device to perform operations comprising:
receiving scene description information associated with an image, the scene description information comprising semantic data for a plurality of objects within the image;
assigning a weight to each object in the plurality of objects based on the semantic data, the weight being independent of a geographic location, to yield weighted scene description information;
organizing the image and the weighted scene description information into a data structure, wherein the data structure comprises, for each object in the plurality of objects, a storage array as an infinite array of the each object;

classifying the image based on the data structure to, yield a classified image;

modifying the weight a specific object in the plurality of objects based on user search preferences and repeated searching for the specific object, to yield a modified object weight;

storing the modified object weight for the specific object in the infinite array for the specific object; and upon receiving a search query, responding to the search query by returning matching images in the image database based on a comparison of the search query to the data structure using the modified object weight.

15. The computer-readable storage device of claim 14, wherein the scene description information comprises one of environmental data, chronologically relevant audio input to a network time difference of arrival data, and device orientation data.

16. The computer-readable storage device of claim 15, wherein the environmental data comprises one of time, color, object detection, temperature, received audio when the image was received by a device, and audio.

17. The computer-readable storage device of claim 14, having additional instructions stored which result in the operations further comprising:

after storing the classified image in the image database and upon retrieval of the image from the image database, receiving second scene description information associated with the image and storing the second scene description information into the data structure.

18. The computer-readable storage device of claim 14, having additional instructions stored which result in the operations further comprising:

during a later viewing by a user of the image stored in the image database, receiving second scene description information associated with the image and automatically assigning a reduced weight to a portion of the second scene description information wherein the second scene description information is stored in the data structure.

19. The computer-readable storage device of claim 18, wherein the reduced weight assigned to the second scene description information is based on one parameter that relates data associated with the scene description information to the second scene description information.

* * * * *